United States Patent
Lee et al.

(10) Patent No.: US 11,528,687 B2
(45) Date of Patent: Dec. 13, 2022

(54) APPARATUS AND METHOD FOR TRANSMITTING A BUFFER STATUS REPORT

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 16/609,644

(22) PCT Filed: May 3, 2018

(86) PCT No.: PCT/KR2018/005145
§ 371 (c)(1),
(2) Date: Oct. 30, 2019

(87) PCT Pub. No.: WO2018/203684
PCT Pub. Date: Nov. 8, 2018

(65) Prior Publication Data
US 2020/0059925 A1    Feb. 20, 2020

Related U.S. Application Data

(60) Provisional application No. 62/501,079, filed on May 3, 2017.

(51) Int. Cl.
*H04W 72/04* (2009.01)
*H04W 72/12* (2009.01)
*H04L 5/00* (2006.01)

(52) U.S. Cl.
CPC ....... *H04W 72/0413* (2013.01); *H04L 5/0053* (2013.01); *H04W 72/044* (2013.01); *H04W 72/1284* (2013.01)

(58) Field of Classification Search
CPC .......... H04W 72/0413; H04W 72/044; H04W 72/1284; H04L 5/0053
See application file for complete search history.

(56) References Cited

U.S. PATENT DOCUMENTS

| | | | |
|---|---|---|---|
| 10,582,413 B2 * | 3/2020 | Babaei | ............... H04W 72/1284 |
| 2016/0285775 A1 | 9/2016 | Damnjanovic et al. | |
| 2017/0064534 A1 | 3/2017 | Loehr et al. | |

(Continued)

OTHER PUBLICATIONS

Huawei HiSilicon, "BSR Format", Apr. 7, 2017, 3GPP TSG-RAN WG2 #97bis, R2-1702604, all pages. (Year: 2017).*

(Continued)

*Primary Examiner* — Christopher M Crutchfield
*Assistant Examiner* — Tito Q Pham
(74) *Attorney, Agent, or Firm* — Fish & Richardson P.C.

(57) ABSTRACT

The method for a user equipment (UE) transmitting a buffer status report (BSR) comprises receiving logical channel configuration information from a network, the logical channel configuration information including information related to a plurality of numerologies mapped to each logical channel; when the BSR is triggered, selecting a buffer size reporting numerology for each logical channel; calculating a buffer size for a numerology by including a buffer size of logical channels having the buffer size reporting numerology as the numerology; and reporting the BSR including information of the calculated buffer size.

6 Claims, 5 Drawing Sheets

(56) References Cited

U.S. PATENT DOCUMENTS

| | | | | |
|---|---|---|---|---|
| 2017/0099615 | A1* | 4/2017 | Tesanovic | H04W 28/0278 |
| 2018/0049227 | A1* | 2/2018 | Moon | H04W 72/0446 |
| 2018/0279150 | A1* | 9/2018 | He | H04W 72/1284 |
| 2018/0279388 | A1* | 9/2018 | Miao | H04W 16/02 |
| 2018/0310308 | A1* | 10/2018 | Loehr | H04W 72/10 |
| 2019/0261219 | A1* | 8/2019 | Matsumura | H04W 28/06 |
| 2020/0022094 | A1* | 1/2020 | You | H04W 52/242 |
| 2020/0128585 | A1* | 4/2020 | Kuang | H04W 74/0833 |

OTHER PUBLICATIONS

ASUSTeK, "Discussion on BSR in NR," R2-1703227, 3GPP TSG-RAN WG2 Meeting #97bis, Spokane, Washington, USA, Apr. 3-7, 2017, 4 pages.

Extended European Search Report in European Application No. 18795179.3, dated Oct. 26, 2020, 12 pages.

III, "SR/BSR enhancements support of URLLC service in NR," R2-1703172, 3GPP TSG-RAN WG2 #97bis, Spokane, USA, dated Apr. 3-7, 2017, 7 pages.

LG Electronics Inc., "BSR enhancement for New RAT," R2-1703492, 3GPP TSG-RAN WG2 Meeting #97bis, Spokane, USA, dated Apr. 3-7, 2017, 3 pages.

PCT International Search Report in International Application No. PCT/KR2018/005145, dated Aug. 16, 2018, 10 pages.

Samsung, "BSR for Multiple Numerology Operation," R2-1703016, 3GPP TSG-RAN WG2 NR#97bis, Spokane, USA, dated Apr. 3-7, 2017, 3 pages.

Samsung, "The Details of LCP for Supporting Multiple Numerologies/TTIs," R2-1703716, 3GPP TSG RAN WG2 #97bis, Spokane, USA, dated Apr. 3-7, 2017, 3 pages.

* cited by examiner

[Fig. 1]

[Fig. 3]
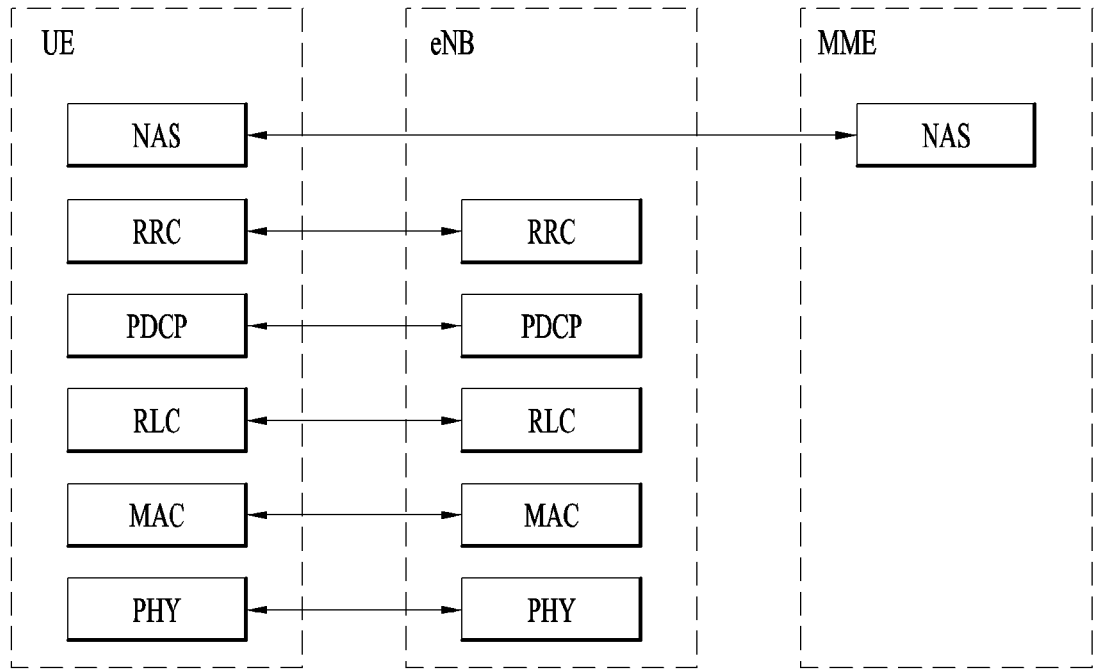
(a) Control-Plane Protocol Stack
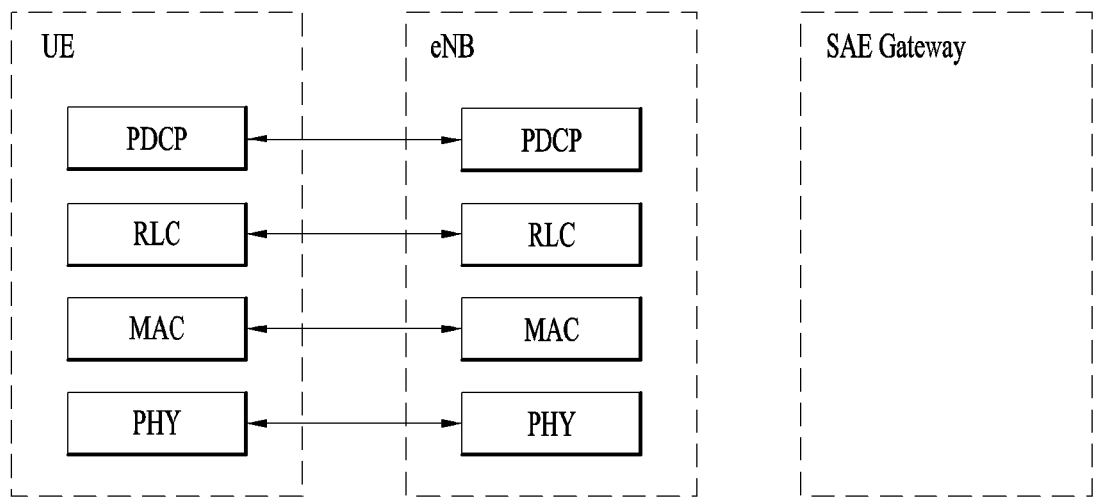
(b) User-Plane Protocol Stack
[Fig. 4]
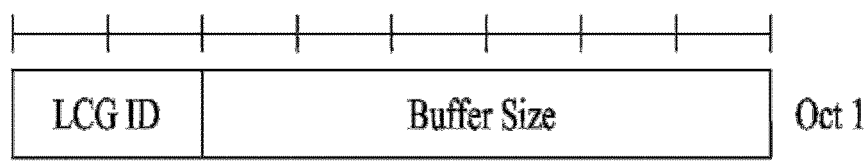

[Fig. 5]
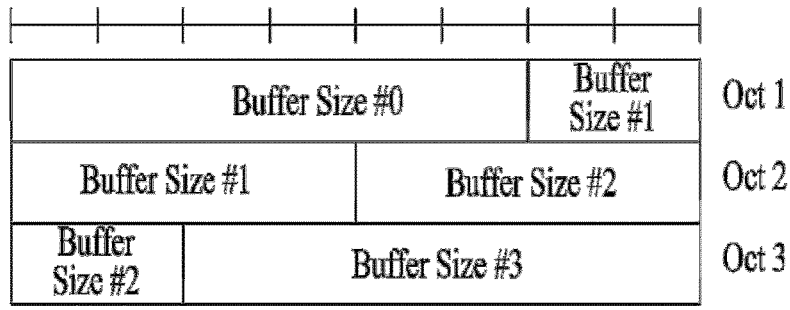
[Fig. 6]
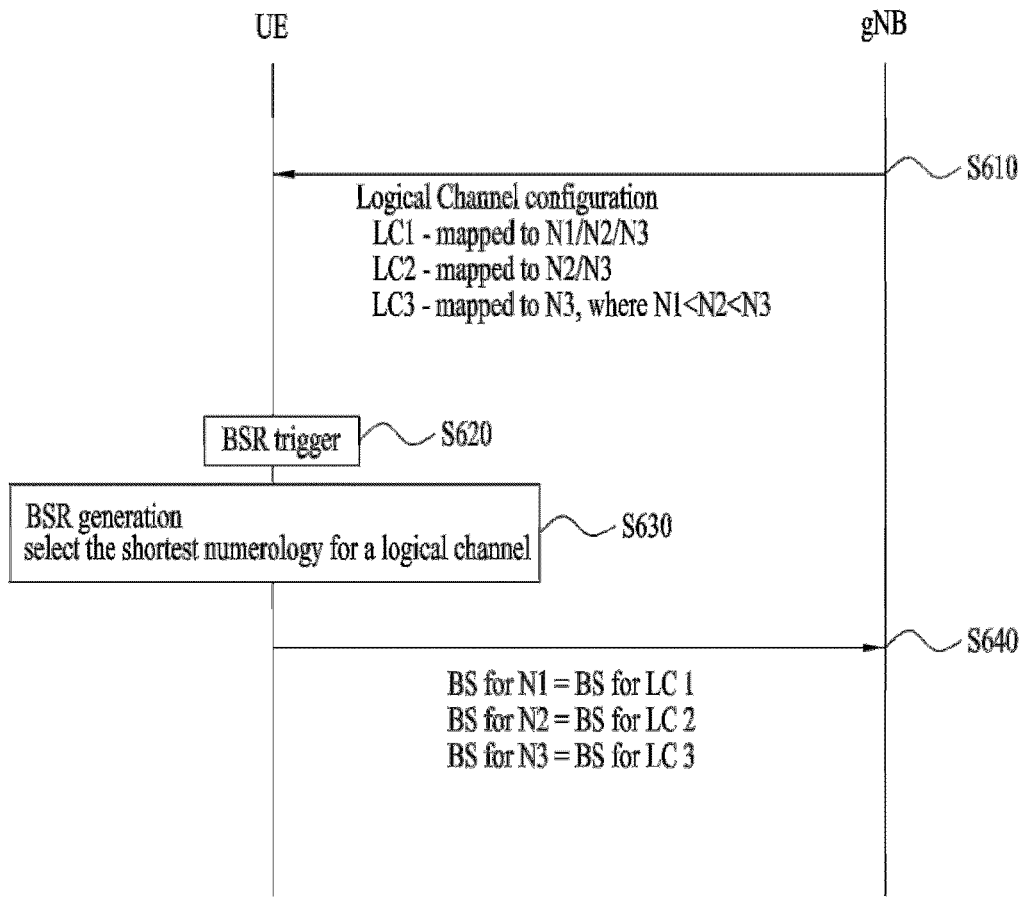

[Fig. 7]
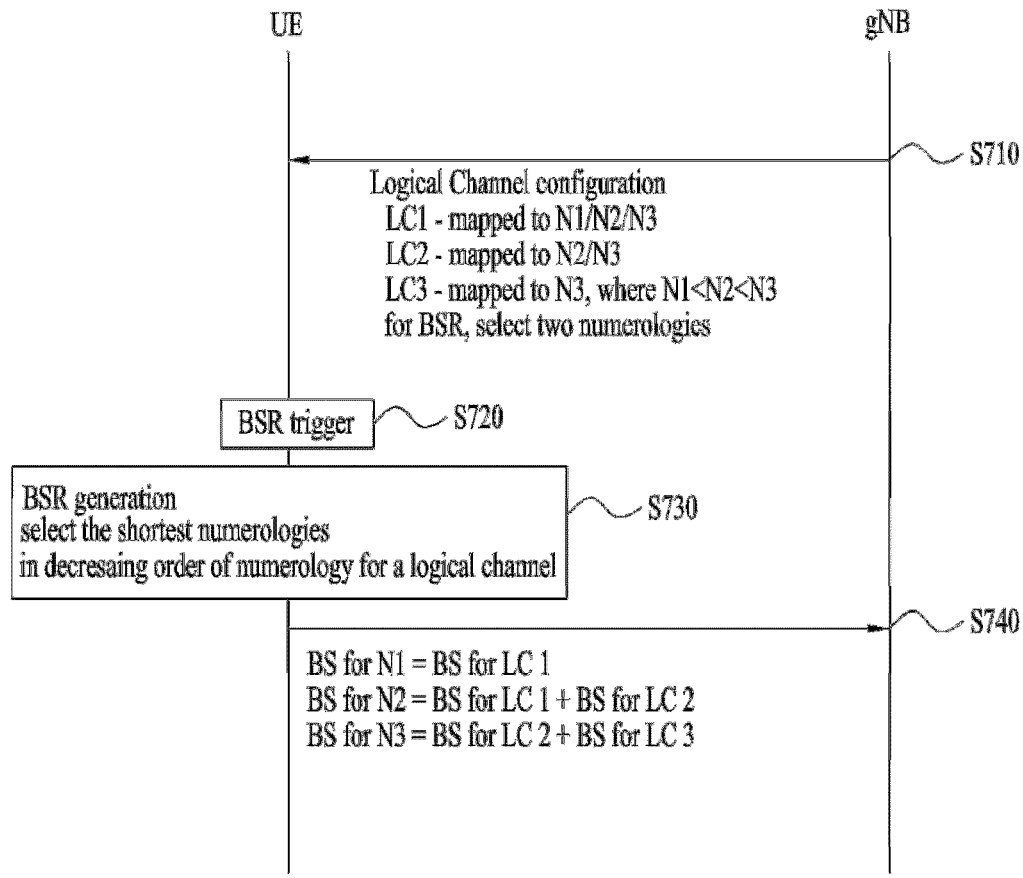
[Fig. 8]
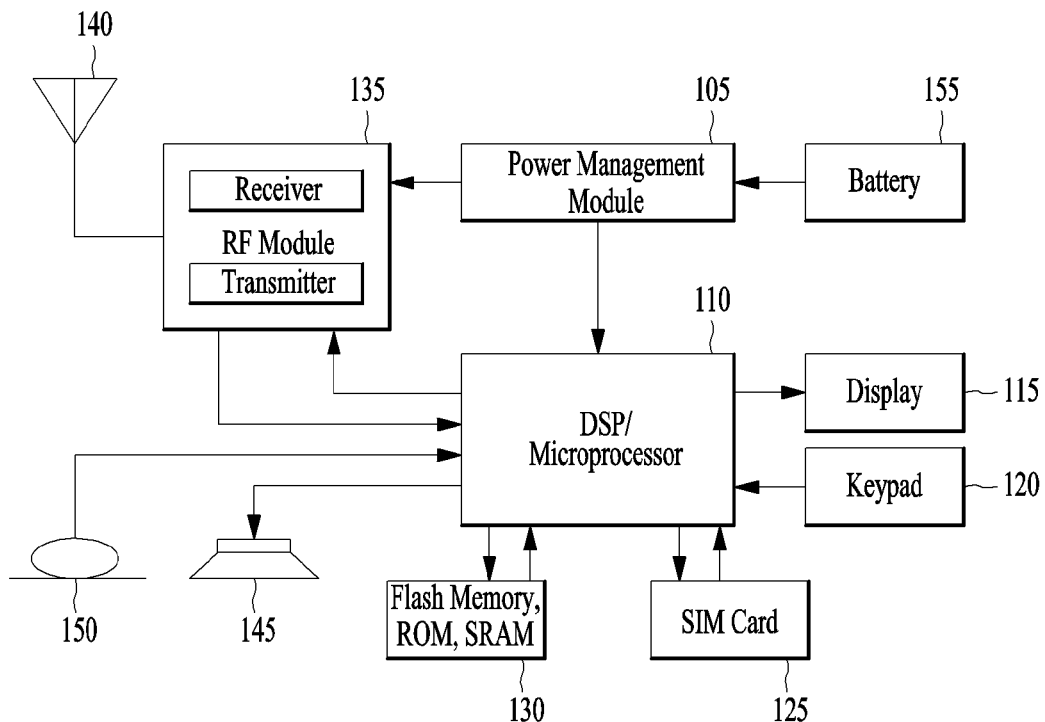

APPARATUS AND METHOD FOR TRANSMITTING A BUFFER STATUS REPORT

CROSS-REFERENCE TO RELATED APPLICATIONS

This application is a National Stage application under 35 U.S.C. § 371 of International Application No. PCT/KR2018/005145, filed on May 3, 2018, which claims the benefit of U.S. Provisional Application No. 62/501,079, filed on May 3, 2017. The disclosures of the prior applications are incorporated by reference in their entirety.

TECHNICAL FIELD

The present invention relates to wireless communication, and more particularly, to apparatus and method for transmitting buffer status report.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB and gNode B (gNB), etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer (L1) of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA)

scheme in downlink and is modulated using a single carrier frequency division multiple access (SC-FDMA) scheme in uplink.

The MAC layer (L2) of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In the development to a New Radio Access Technology (NR), NR system should be able to use frequency bands up to 100 GHz. In NR, random access (RA) procedure may be an essential procedure for all UEs when establishing an RRC Connection or scheduling, increased latency. It is not desirable that random access preamble collision between UEs is not desirable. Therefore, a new method is required in supporting RA procedure with NR system.

DISCLOSURE OF INVENTION

Technical Problem

An object of the present invention devised to solve the problem lies in method for a user equipment (UE) transmitting a buffer status report (BSR).

Another object of the present invention is to provide a user equipment (UE) for transmitting a buffer status report (BSR).

The technical objects that can be achieved through the present invention are not limited to what has been particularly described hereinabove and other technical objects not described herein will be more clearly understood by persons skilled in the art from the following detailed description.

Solution to Problem

The object of the present invention can be achieved by providing a method for a user equipment (UE) transmitting a buffer status report (BSR) comprises receiving logical channel configuration information from a network, the logical channel configuration information including information related to a plurality of numerologies mapped to each logical channel; when the BSR is triggered, selecting a buffer size reporting numerology for each logical channel; calculating a buffer size for a numerology by including a buffer size of logical channels having the buffer size reporting numerology same as the numerology; and reporting the BSR including information of the calculated buffer size. The selected buffer size reporting numerology for a corresponding logical channel has a shortest TTI length or a most wide OFDM subcarrier spacing of the corresponding logical channel. The selected buffer size reporting numerology is indicated by the network. The logical channel configuration information further includes an identity of the logical channel. The selecting comprises selecting multiple buffer size reporting numerology for each logical channel.

The object of the present invention can be achieved by providing a method for a user equipment (UE) transmitting a buffer status report (BSR) comprises receiving logical channel configuration information from a network, the logical channel configuration information including information related to one or more numerologies mapped to each logical channel; when the BSR is triggered, selecting a numerology for each logical channel; calculating a buffer size for a numerology by including a buffer size of logical channels in which the numerology is selected; and transmitting the BSR including information of the calculated buffer size.

In another aspect of the present invention, provided herein is a user equipment (UE) for transmitting a buffer status report (BSR) comprises a receiver configured to receive logical channel configuration information from a network, the logical channel configuration information including information related to a plurality of numerologies mapped to each logical channel; a processor configured to, when the BSR is triggered, select a buffer size reporting numerology for each logical channel; and calculate a buffer size for a numerology by including a buffer size of logical channels having the buffer size reporting numerology same as the numerology; and a transmitter configured to report the BSR including information of the calculated buffer size. The selected buffer size reporting numerology for a corresponding logical channel has a shortest TTI length or a most wide OFDM subcarrier spacing of the corresponding logical channel. The selected buffer size reporting numerology is indicated by the network. The logical channel configuration information further include an identity of the logical channel. The processor is further configured to select multiple buffer size reporting numerology for each logical channel.

In another aspect of the present invention, provided herein is a user equipment (UE) for transmitting a buffer status report (BSR) comprises a receiver configured to receive logical channel configuration information from a network, the logical channel configuration information including information related to one or more numerologies mapped to each logical channel; a processor configured to, when the BSR is triggered, select a numerology for each logical channel; and calculate a buffer size for a numerology by including a buffer size of logical channels in which the numerology is selected, a transmitter configured to transmit the BSR including information of the calculated buffer size.

Advantageous Effects of Invention

An embodiment of the present invention leads efficient usage of uplink resource by avoiding duplicated BSR.

It will be appreciated by those skilled in the art that the effects that can be achieved through the embodiments of the present disclosure are not limited to those described above and other effects of the present disclosure will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

FIG. 3 is a diagram showing a control plane and a user plane of a radio interface protocol between a UE and an E-UTRAN based on a 3GPP radio access network standard.

FIG. 4 is a diagram illustrating a short BSR and Truncated BSR MAC control element.

FIG. 5 is a diagram illustrating a long BSR and Truncated BSR MAC control element.

FIG. 6 is a diagram illustrating numerology selection for BSR according to an embodiment of the present invention.

FIG. 7 is a diagram illustrating numerology selection for BSR according to another embodiment of the present invention.

FIG. 8 is a block diagram of an apparatus (e.g., communication apparatus) according to an embodiment of the present invention.

MODE FOR THE INVENTION

Figure 1:
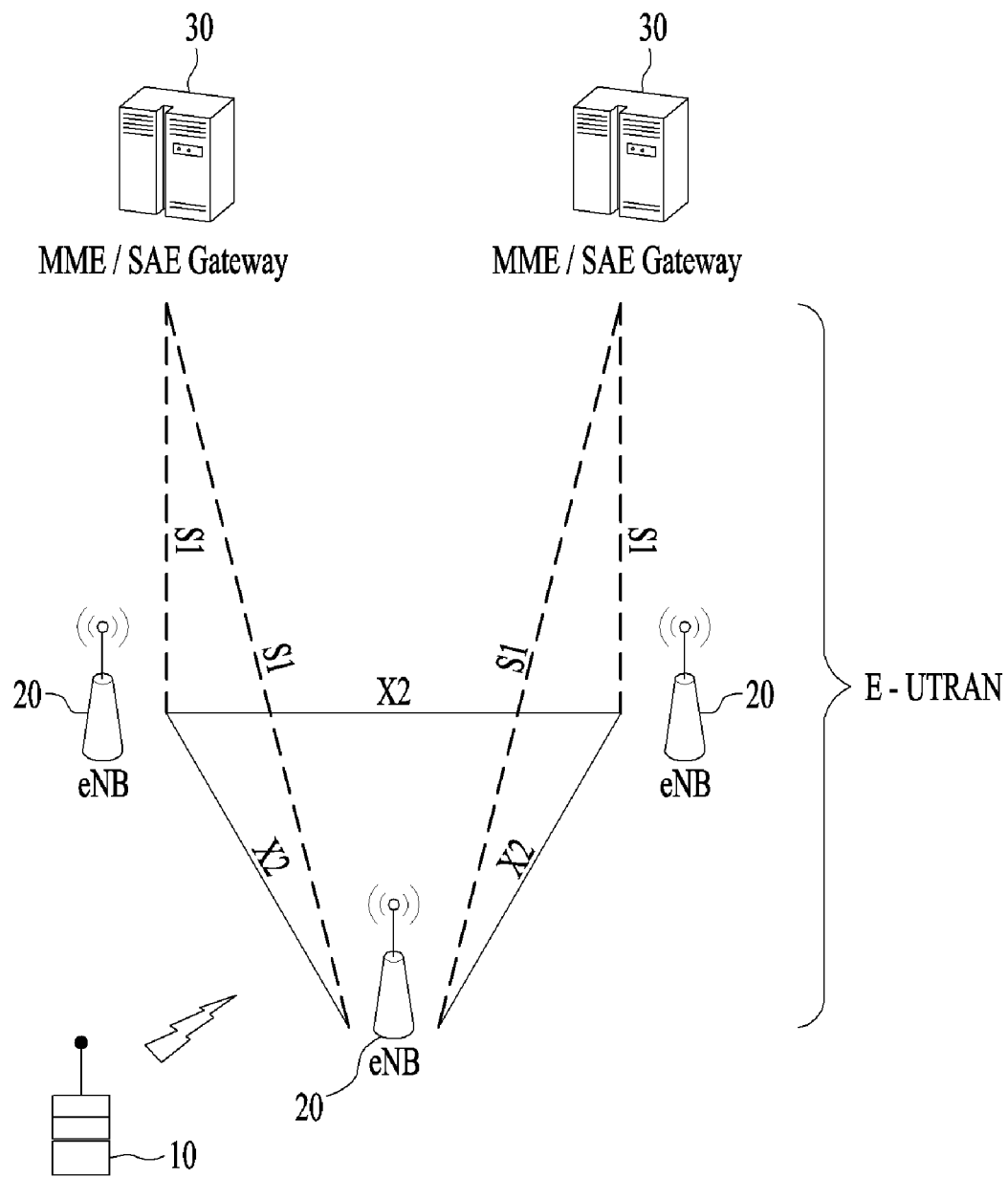
FIG. 1 is a block diagram illustrating network structure of an evolved universal mobile telecommunication system (E-UMTS).
Figure 2:
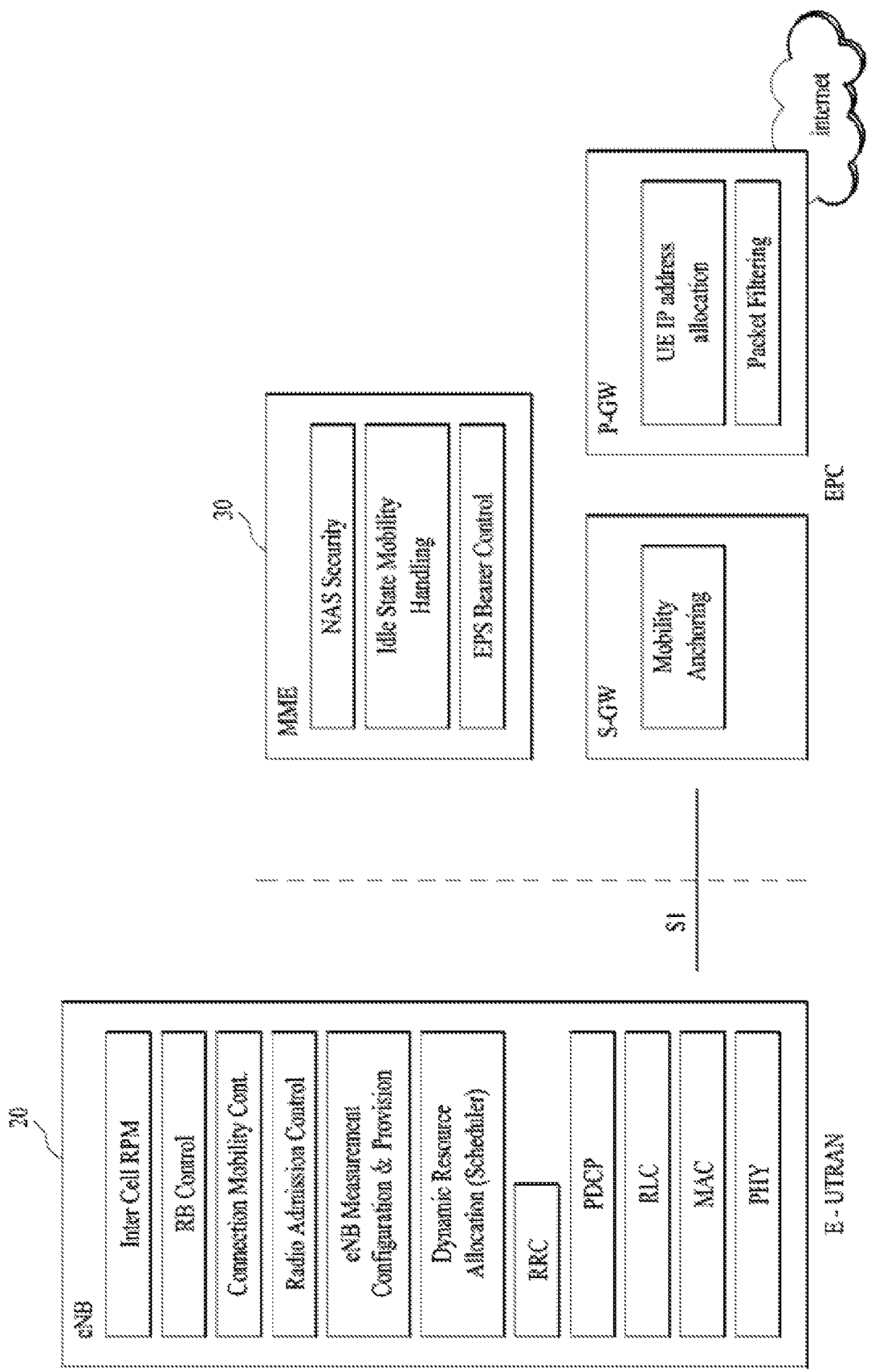
FIG. 2 is a block diagram depicting architecture of a typical E-UTRAN and a typical EPC.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

Buffer Status Report (BSR)

Description related to buffer status reporting of 3GPP LTE/LTE-A standard document is as following.

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG (Logical Channel Group).

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

For Regular BSR:

if the BSR is triggered due to data becoming available for transmission for a logical channel for which logicalChannelSR-ProhibitTimer is configured by upper layers:

start or restart the logicalChannelSR-ProhibitTimer;

else:

if running, stop the logicalChannelSR-ProhibitTimer.

For Regular and Periodic BSR:

if more than one LCG has data available for transmission in the TTI where the BSR is transmitted: report Long BSR;

else report Short BSR.

For Padding BSR:

if the number of padding bits is equal to or larger than the size of the Short BSR plus its subheader but smaller than the size of the Long BSR plus its subheader:

if more than one LCG has data available for transmission in the TTI where the BSR is transmitted: report Truncated BSR of the LCG with the highest priority logical channel with data available for transmission;

else report Short BSR.

else if the number of padding bits is equal to or larger than the size of the Long BSR plus its subheader, report Long BSR.

For NB-IoT:

if rai-Activation is configured, and a buffer size of zero bytes has been triggered for the BSR, and the UE may have more data to send or receive in the near future (FFS):

cancel any pending BSR.

If the Buffer Status reporting procedure determines that at least one BSR has been triggered and not cancelled:
  if the MAC entity has UL resources allocated for new transmission for this TTI:
    instruct the Multiplexing and Assembly procedure to generate the BSR MAC control element(s);
    start or restart periodicBSR-Timer except when all the generated BSRs are Truncated BSRs;
    start or restart retxBSR-Timer.
  else if a Regular BSR has been triggered and logicalChannelSR-ProhibitTimer is not running:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR, except for NB-IoT. A Padding BSR is triggered for a specific MAC PDU only and the trigger is cancelled when this MAC PDU has been built.

Buffer Status Report MAC Control Elements

FIG. 4 is a diagram illustrating a short BSR and Truncated BSR MAC control element, FIG. 5 is a diagram illustrating a long BSR and Truncated BSR MAC control element.

Buffer Status Report (BSR) MAC control elements consist of either:
  Short BSR and Truncated BSR format: one LCG ID field and one corresponding Buffer Size field (as shown in the FIG. 4); or
  Long BSR format: four Buffer Size fields, corresponding to LCG IDs #0 through #3 (as shown in the FIG. 4).
The fields LCG ID and Buffer Size are defined as follow. The Table 1 illustrates a buffer size levels for BSR.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

The Table 2 illustrates extended Buffer size levels for BSR.

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |

TABLE 2-continued

| Index | Buffer Size (BS) value [bytes] |
|---|---|
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

LCG ID: The Logical Channel Group ID (LCG ID) field of the FIG. 4 identifies the group of logical channel(s) which buffer status is being reported. The length of the field is 2 bits. For NB-IoT, the LCG ID is set to #0.

Buffer Size: The Buffer Size field identifies of the FIG. 4 the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified. The size of the RLC and MAC headers are not considered in the buffer size computation. The length of this field is 6 bits. If extendedBSR-Sizes is not configured, the values taken by the Buffer Size field are shown in the Table 1. If extendedBSR-Sizes is configured, the values taken by the Buffer Size field are shown in the Table 2.

The BSR formats are identified by MAC PDU subheaders with LCIDs as specified in the Table 2.

The existing LTE BSR framework is used as baseline for NR BSR framework. Further enhancements at least related to numerologies and granularity and can be further discussed. Single logical channel can be mapped to one or more numerology/TTI duration. ARQ can be performed on any numerologies/TTI lengths that the LCH is mapped to. The RLC configuration is per logical channel without dependency on numerology/TTI length. Logical channel to numerology/TTI length mapping can be reconfigured via RRC reconfiguration. A single MAC entity can support one or more numerology/TTI durations. Logical Channel Prioritization (LCP) takes into account the mapping of logical channel to one or more numerology/TTI duration.

In OFDM system, numerology refers to OFDM Subcarrier Spacing (OFDM SCS), Cyclic Prefix (CP) length, Transmission Time Interval (TTI) length, sampling time, OFDM symbol duration, and so on. Among these, at least TTI length will be used in NR MAC in order to meet the requirement of data transmission, for instance, short TTI (sTTI) will be used for scheduling ultra-reliable and low-latency communication (URLLC) data. For this, there will be a mapping between a logical channel and numerology, multiple numerologies can be mapped to a logical channel. With this mapping, logical channel data can be transferred by using only the uplink resource with the mapped numerology.

In order to schedule uplink resource with proper numerology, the network needs to know the amount of data that can be transmitted by using the uplink resource with a numerology. One simple way to do this is to report BSR per numerology. However, if there are multiple numerologies mapped to a logical channel, the amount of the logical channel will be counted multiple times, which is a duplicated BSR. This may lead to a waste of uplink resource because the network may provide uplink resource based on the duplicated BSR. Therefore, a new mechanism is needed to avoid duplicated BSR.

A UE is configured with a logical channel which is mapped to at least two numerologies. When the UE reports buffer size of the logical channel to a network (e.g., gNodeB), the UE selects at least one numerology among the at least two numerologies mapped to the logical channel. The UE counts the buffer size of the logical channel, and the UE considers the buffer size of the logical channel when calculating the buffer size of the selected numerology. In other words, if the numerology (e.g., N1) is mapped to the logical channel (e.g., LC1) but is not selected numerology, when calculating the buffer size of a numerology 1 (N1), the UE excludes the buffer size of the logical channel (LC1) from the buffer size of the numerology (N1).

The UE may receive logical channel configuration including the logical channel identity and two or more numerologies that are mapped to a logical channel. In other words, the UE may receive logical channel configuration information from a network (e.g., via a RRC signal). The logical channel configuration information may include information associated with logical channel identity and mapping information between logical channels and numerologies. In this case, two or more numerologies may be are mapped to a logical channel.

When a BSR is triggered, the UE selects one or more numerologies in the numerologies mapped to the logical channel as follows. The UE may a numerology that is with the shortest TTI length in the numerologies mapped to the logical channel. The UE may a numerology that is with the most wide OFDM subcarrier spacing. The UE may a numerology that is indicated by the network. The UE may a numerology indicated by the network (e.g., gNodeB). The network may indicate one or more specific numerologies. The network may indicate the number of numerologies that the UE selects. Then, the UE selects the indicated number of numerologies. In this case, the UE may select the indicated number of numerologies in decreasing order of TTI length or OFDM subcarrier spacing.

The UE calculates a buffer size of a numerology. If the numerology is mapped to a logical channel and is the selected numerology for the logical channel, the UE may calculate the buffer size of the logical channel as the buffer size of the numerology. If the numerology is mapped to the logical channel but is not the selected numerology for the logical channel, the UE excludes the buffer size of the logical channel from the buffer size of the numerology. If the UE selects multiple numerologies for the logical channel, the UE includes the buffer size of the logical channel into the buffer size of the selected multiple numerologies for the logical channel.

The UE generates a BSR by including information of buffer size of the numerology. The UE then transmits generated BSR to the network.

FIG. 6 is a diagram illustrating numerology selection for BSR according to an embodiment of the present invention.

Referring to the FIG. 6, a UE may receive logical channel configuration information (S610). The logical channel configuration information may comprise mapping information between numerologies (N1, N2, and N3) and logical channels (LC1, LC2, and LC3). As an example, the UE may be configured with three logical channels (LC1, LC2, and LC3). LC1 is mapped to numerology 1 (N1), numerology 2 (N2) and numerology (N3), LC2 is mapped to N2 and N3, and LC3 is mapped to N3, wherein N1, N2, and N3 are in increasing order of the length of numerology, i.e., N1 has the shortest numerology and N3 has the longest numerology.

The UE triggers a BSR (S620). The UE generates the BSR for each numerology by selecting specific numerology (e.g., the shortest numerology) for each logical channel (S630). In other words, the UE may select a specific numerology per each logical channel. As an example, the UE may select N1 for LC1, N2 for LC2, and N3 for LC3. The UE calculates a buffer size for N1 as the buffer size of LC1, a buffer size for N2 as the buffer size of LC2, and a buffer size for N3 as the buffer size of LC3. The UE may transmit the generated BSR for each numerology to the network (e.g., gNodeB) (S640).

FIG. 7 is a diagram illustrating numerology selection for BSR according to another embodiment of the present invention.

Referring to the FIG. 7, a UE may receive logical channel configuration information (S710). The logical channel configuration information may comprise mapping information between numerologies (N1, N2, and N3) and logical channels (LC1, LC2, and LC3). As an example, the UE may be configured with three logical channels (LC1, LC2, and LC3). LC1 is mapped to numerology 1 (N1), numerology 2 (N2) and numerology (N3), LC2 is mapped to N2 and N3, and LC3 is mapped to N3, wherein N1, N2, and N3 are in increasing order of the length of numerology, i.e., N1 has the shortest numerology and N3 has the longest numerology.

The UE triggers a BSR (S720). The UE generates the BSR for each numerology by selecting two numerology (e.g., the shorter numerologies) for each logical channel (S730). In other words, the UE may select two numerologies per each logical channel. In this case, the UE may select two numerologies in decreasing order of numerology for a logical channel. As an example, the UE may select N1 and N2 for LC1, N2 and N3 for LC2, and N3 for LC3. Herein, the selected numerology is referred as a buffer size reporting numerology.

Since N1 is selected for LC1 and is not selected for LC2 and LC3, when calculating buffer size of N1, the UE excludes the buffer size of LC2 and LC3. Thus, the UE calculates the buffer size for N1 as the buffer size of LC1. Since N2 is selected for LC1 and LC2, and is not selected for LC3, when calculating buffer size of N2, the UE excludes the buffer size of LC3. Thus, the UE calculates the buffer size for N2 as the buffer size of LC1 plus the buffer size of LC2. Since N3 is selected for LC2 and LC3, and is not selected for LC1, when calculating buffer size of N3, the UE excludes the buffer size of LC1. Thus, the UE calculates the buffer size for N3 as the buffer size of LC2 plus the buffer size of LC3. The UE may transmit the generated BSR including information of the calculated buffer size to the network (e.g., gNodeB) (S740). The UE may transmit generated BSR for each numerology FIG. 8 is a block diagram of an apparatus (e.g., communication apparatus) according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive signal from the network, and a transmitter (135) configured to transmit signals to the network. The receiver and transmitter can constitute the transceiver (135). The UE further comprises a processor (110) connected to the transceiver (135: receiver and transmitter).

Also, FIG. 8 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged.

Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Apparatus and method for transmitting a buffer status report (BSR) are applicable to a variety of wireless communication systems, e.g. IEEE system, in addition to the 3GPP system.

The invention claimed is:

1. A method performed by a user equipment (UE) configured to transmit a buffer status report (BSR), the method comprising:
receiving logical channel configuration information from a network, the logical channel configuration information including information related to one or more numerologies mapped to each logical channel;
based on the BSR being triggered, selecting a numerology for buffer size reporting of a corresponding logical channel, among the one or more numerologies mapped to the corresponding logical channel;
calculating a buffer size of the corresponding logical channel as a buffer size of the selected numerology;
generating a BSR including information of the calculated buffer size; and
transmitting the generated BSR to the network,
wherein the numerology relates to an orthogonal frequency division multiplexing (OFDM) subcarrier spacing, and
wherein the UE selects the numerology having a most wide OFDM subcarrier spacing, among the one or more numerologies mapped to the corresponding logical channel.

2. The method according to claim 1, wherein the logical channel configuration information further include an identity of the logical channel.

3. The method according to claim 1, further comprising selecting multiple numerologies for the buffer size reporting of the each logical channel based on a number of numerologies indicated by the network.

4. A user equipment (UE) configured to transmit a buffer status report (BSR), the UE comprising:
a receiver and a transmitter; and
a processor configured to:
receive, via the receiver, logical channel configuration information from a network, the logical channel configuration information including information related to one or more numerologies mapped to each logical channel;
based on the BSR being triggered, select a numerology for buffer size reporting of a corresponding logical channel among the one or more numerologies mapped to the corresponding logical channel;
calculate a buffer size of the corresponding logical channel as a buffer size of the selected numerology;
generate a BSR including information of the calculated buffer size; and
transmit, via the transmitter, the generated BSR to the network,
wherein the numerology relates to an orthogonal frequency division multiplexing (OFDM) subcarrier spacing, and
wherein the UE selects the numerology having a most wide OFDM subcarrier spacing among the one or more numerologies mapped to the corresponding logical channel.

5. The UE according to claim 4, wherein the logical channel configuration information further include an identity of the logical channel.

6. The UE according to claim 4, wherein the processor is further configured to select multiple numerologies for the buffer size reporting of the each logical channel based on a number of numerologies indicated by the network.

* * * * *